(12) United States Patent
Drennen et al.

(10) Patent No.: US 9,360,095 B2
(45) Date of Patent: Jun. 7, 2016

(54) ELECTROMECHANICAL ACTUATOR DISTAL POSITION STOPPING ASSEMBLY

(71) Applicant: GOODRICH CORPORATION, Charlotte, NC (US)

(72) Inventors: David B. Drennen, Bellbrook, OH (US); Harald Klode, Centerville, OH (US); Kevin Rehfus, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 361 days.

(21) Appl. No.: 14/071,438

(22) Filed: Nov. 4, 2013

(65) Prior Publication Data
US 2015/0122061 A1     May 7, 2015

(51) Int. Cl.
| | |
|---|---|
| *F16H 25/12* | (2006.01) |
| *F16H 25/22* | (2006.01) |
| *F16H 25/20* | (2006.01) |
| *H02K 7/06* | (2006.01) |

(52) U.S. Cl.
CPC ........ *F16H 25/2204* (2013.01); *F16H 25/2015* (2013.01); *H02K 7/06* (2013.01); *F16H 2025/2075* (2013.01); *Y10T 74/18576* (2015.01)

(58) Field of Classification Search
CPC ..... F16C 19/30; F16H 25/20; F16H 25/2204; F16H 25/2418; Y10T 74/19702
See application file for complete search history.

(56) References Cited

U.S. PATENT DOCUMENTS

| | | | | |
|---|---|---|---|---|
| 4,053,167 A | * | 10/1977 | Jelinek ................. | F16H 25/2418 277/354 |
| 4,366,723 A | * | 1/1983 | Wilke .................. | F16H 25/2228 74/216.3 |
| 6,711,963 B2 | * | 3/2004 | Yabe .................... | F16H 25/2204 74/89.26 |
| 2001/0010176 A1 | * | 8/2001 | Tsukada ............. | F16H 25/2418 74/89.44 |
| 2002/0144560 A1 | * | 10/2002 | Yatsushiro .......... | F16H 25/2418 74/89.4 |
| 2008/0196523 A1 | * | 8/2008 | Liu ..................... | F16H 25/2418 74/89.4 |
| 2009/0308187 A1 | * | 12/2009 | Schmid ............... | F16H 25/2418 74/89.4 |
| 2012/0060631 A1 | * | 3/2012 | Hsieh .................. | F16H 25/2204 74/89.4 |
| 2015/0233457 A1 | * | 8/2015 | Heck ................... | F16H 25/2418 74/89.4 |

* cited by examiner

*Primary Examiner* — David M Fenstermacher
(74) *Attorney, Agent, or Firm* — Snell & Wilmer L.L.P.

(57) ABSTRACT

An electromechanical actuator (EMA) is disclosed. The EMA may comprise an EMA housing having a distal stop that extends radially inward towards a longitudinal axis of the EMA housing, a hail nut extending axially within the EMA housing, and/or a ball screw extending axially within the ball nut, The ball nut may translate axially in a distal direction in response to a rotation by the ball screw, and/or the ball nut may be halted in the axially distal translation in response to contact with the distal stop. The distal stop may be coupled to the EMA. housing. The distal stop may comprise a continuous annular structure. The EMA may further comprise a seal located radially inward of a portion of the distal stop, which may be in contact with said portion and the ball nut and adapted to prevent debris from entering the EMA.

15 Claims, 5 Drawing Sheets

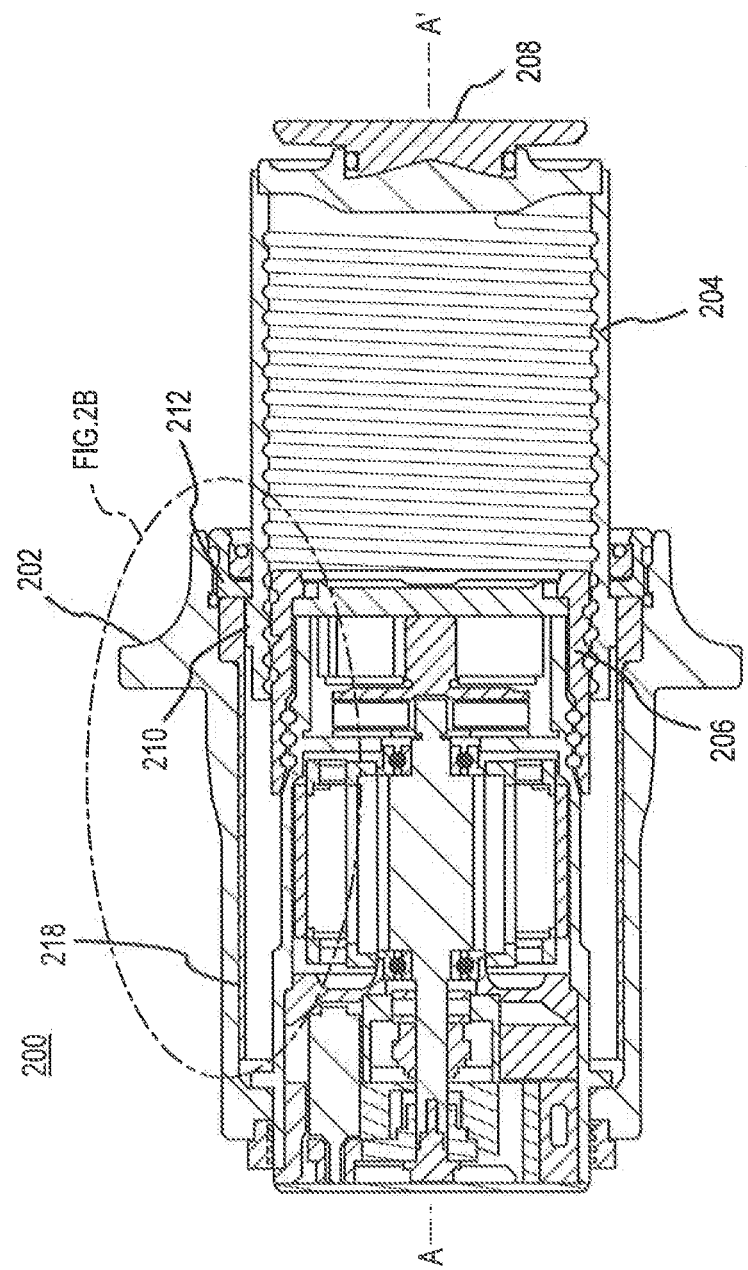

ELECTROMECHANICAL ACTUATOR DISTAL POSITION STOPPING ASSEMBLY

FIELD

The present disclosure relates to electromechanical actuators ("EMAs"), and more particularly, to a stopping assembly for EMAs.

BACKGROUND

EMAs are braking assemblies that forcefully move a translating member (e.g., such as a "ball nut") and/or other components, against a brake disk stack to generate an actuation force. This actuation force drives the ball nut into forceful engagement with the brake disk stack to generate a braking force.

SUMMARY

An electromechanical actuator (EMA) is disclosed. The EMA may comprise an EMA housing having a distal stop that extends radially inward towards a longitudinal axis of the EMA housing, a ball nut extending axially within the EMA housing, and/or a ball screw extending axially within the ball nut. The ball nut may translate axially in a distal direction in response to a rotation by the ball screw, and/or the ball nut may be halted in the axially distal translation in response to contact with the distal stop. The distal stop may be coupled to the EMA housing. The distal stop may comprise a continuous annular structure. The EMA may further comprise a seal located radially inward of a portion of the distal stop, which may be in contact with said portion and the ball nut and adapted to prevent debris from entering the EMA. The ball nut may comprise a projection extending radially outward from an outer surface of the ball nut. The projection may make contact with the distal stop as the ball nut translates axially in the distal direction to halt the axially distal translation of the ball nut. The projection may comprise a continuous annular structure. The distal stop may include a compliant surface.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 2A illustrates, in accordance with various embodiments, a cross-sectional schematic view of an EMA shown in an extended position.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, an "inner surface" may comprise any surface that is situated radially inward of any other surface with respect to a central longitudinal axis, as defined herein, labeled A-A'. Thus, an inner surface may be situated radially inward of an "outer surface" with respect to the axis A-A'.

In addition, the EMA may extend along the axis defined by the line marked A'-A'. The portion near A may be referred to as proximal and the portion near A' may be referred to as distal. In that regard, A is proximal to A' and A' is distal to A. Translation in an axial direction towards A is considered movement in a proximal direction and translation in an axial direction towards A' is considered movement in a distal direction.

Figure 1A:
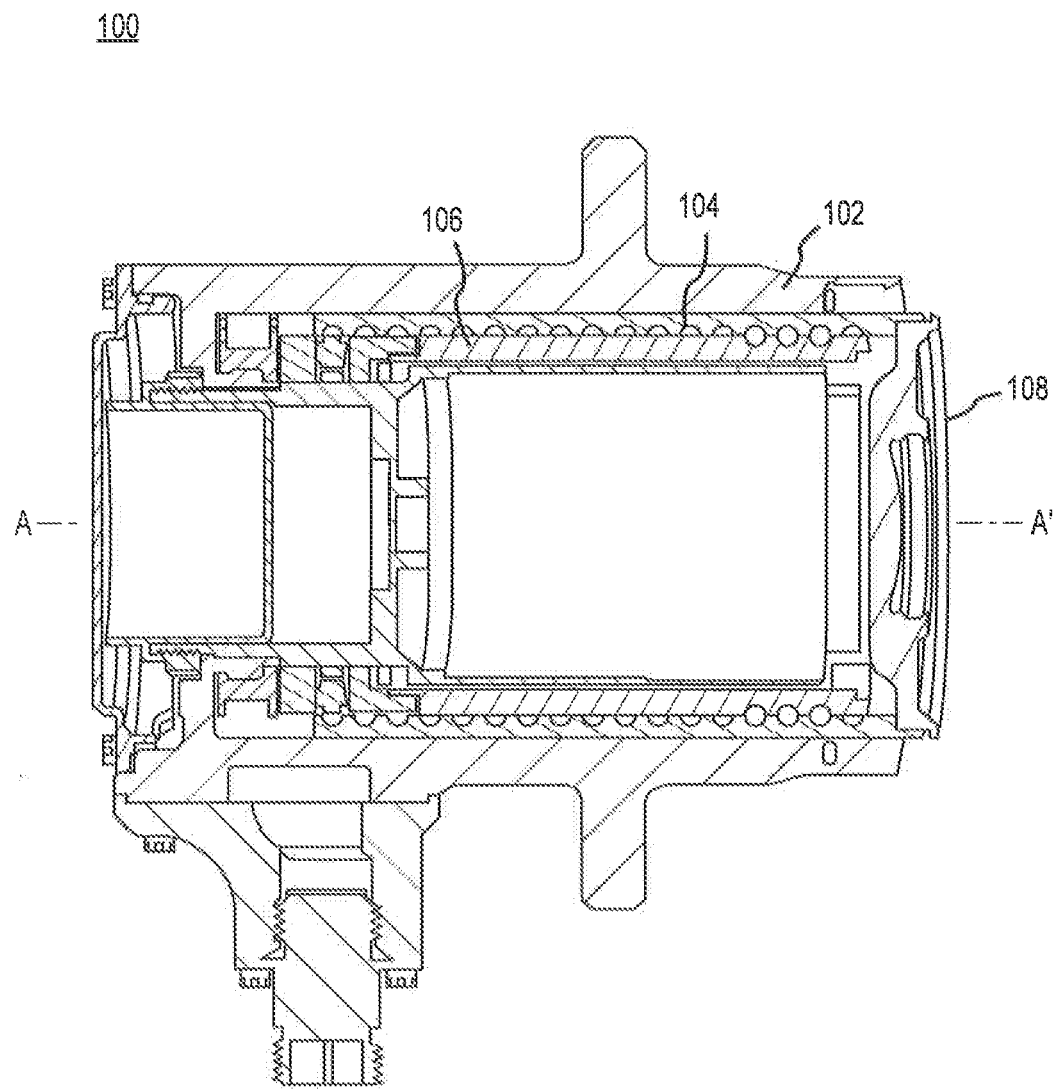
FIG. 1A illustrates a cross-sectional schematic view of a conventional EMA.

With reference to FIG. 1A, a cross-sectional schematic view of a conventional EMA 100 is shown. The EMA 100 may comprise an EMA housing 102, a ball nut 104, a ball screw 106, and a disc or "puck" 108. The EMA housing 100 may comprise a generally annular structure configured to house the ball nut 104 and extending along the axis A-A'. The ball nut 104 may comprise a generally annular housing that extends axially along the axis A-A' within the EMA housing 102. The ball screw 106 may comprise a generally annular housing that extends axially along the axis A'A' within the ball nut 104. A variety of drive components may be housed within the ball nut 104, such as, for example, an electromechanical drive motor, drive shaft, gearing system, and the like. The puck 108 may comprise a generally disc shaped element, and the puck 108 may be coupled to a distal portion of the ball nut 104.

An inner surface of the ball nut 104 may be helically threaded. Likewise, an outer surface of the ball screw 106 may be helically threaded. As described above, the ball screw 106 may be housed within the ball nut 104, and the threading on the outer surface of the ball screw 106 may interface with or mate with the threading on the inner surface of the ball nut 104.

During operation, the ball screw 106 may rotate about an axis A-A'. As the ball screw 106 rotates, the threading on the ball screw 106 may cooperate with the threading in the ball nut 104 to drive the ball nut 104 in a distal direction. As the ball nut 104 translates distally, the puck 108 coupled to the ball nut 104 may also translate distally. The puck 108 may contact a brake stack (e.g., associated with an aircraft wheel) to apply force to the brake stack, thereby slowing and/or halting the rolling motion of the aircraft wheel.

Figure 1B:
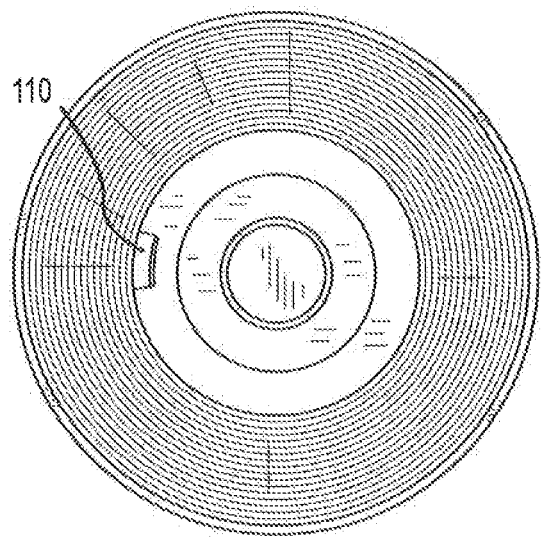
FIG. 1B illustrates a top perspective view of a conventional ball nut.

With reference to FIG. 1B, a longitudinal perspective view of a conventional ball nut 104 (looking from A to A' toward a distal portion of the ball nut 104 along the longitudinal axis A-A') is shown. This ball nut 104 includes a concentrically situated projection 110 or "tooth," located at a distal portion of the ball nut 104.

Figure 1C:
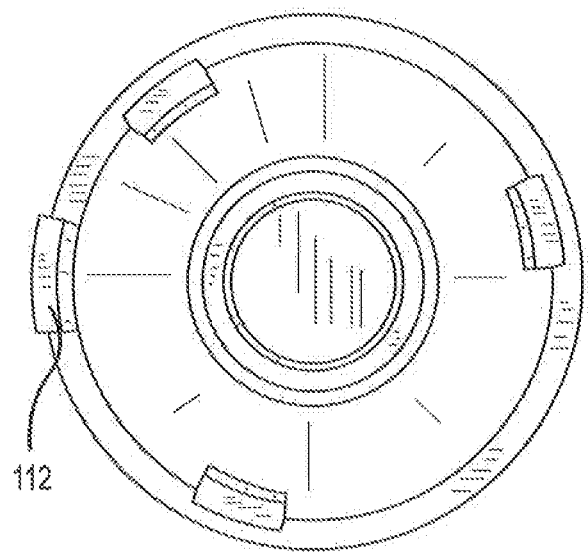
FIG. 1C illustrates a top perspective view of a conventional ball screw.

With reference to FIG. 1C, a longitudinal perspective view of a distal portion of a conventional ball screw 106 is shown. The ball screw 106 includes a concentrically situated projection 112 or tooth as well. This projection 112, like the projection 110, is situated at a distal portion of the ball screw 106.

In operation, as described above, as the ball screw 106 rotates, the ball nut 104 may translate distally (along the axis A-A') until the projection 112 in the ball screw 106 rotates into contact with the projection 110 in the ball nut 104. As the projection 112 makes contact with the projection 110, the ball nut 104 may be halted in its forward progress, even as the ball screw 106 may attempt to rotate in an effort to force the ball nut 104 distally into greater contact with a brake stack.

A variety of disadvantages are associated with the conventional system depicted at FIGS. 1A-1C, For example, the projection 112 may rotate with substantial angular momentum into the projection. 110. As this occurs, the projection 112 and/or the projection 110 may chip or break, Failure of either projection 110 and/or 112 may result in expulsion of the entire ball nut 104 from its housing within the EMA housing 102, leaving the ball nut 104 (and/or other components) behind as litter and/or other dangerous debris. Such an event may, in addition, result in brake failure. Thus, a variety of disadvantages are associated with existing conventional systems.

Figure 2B:
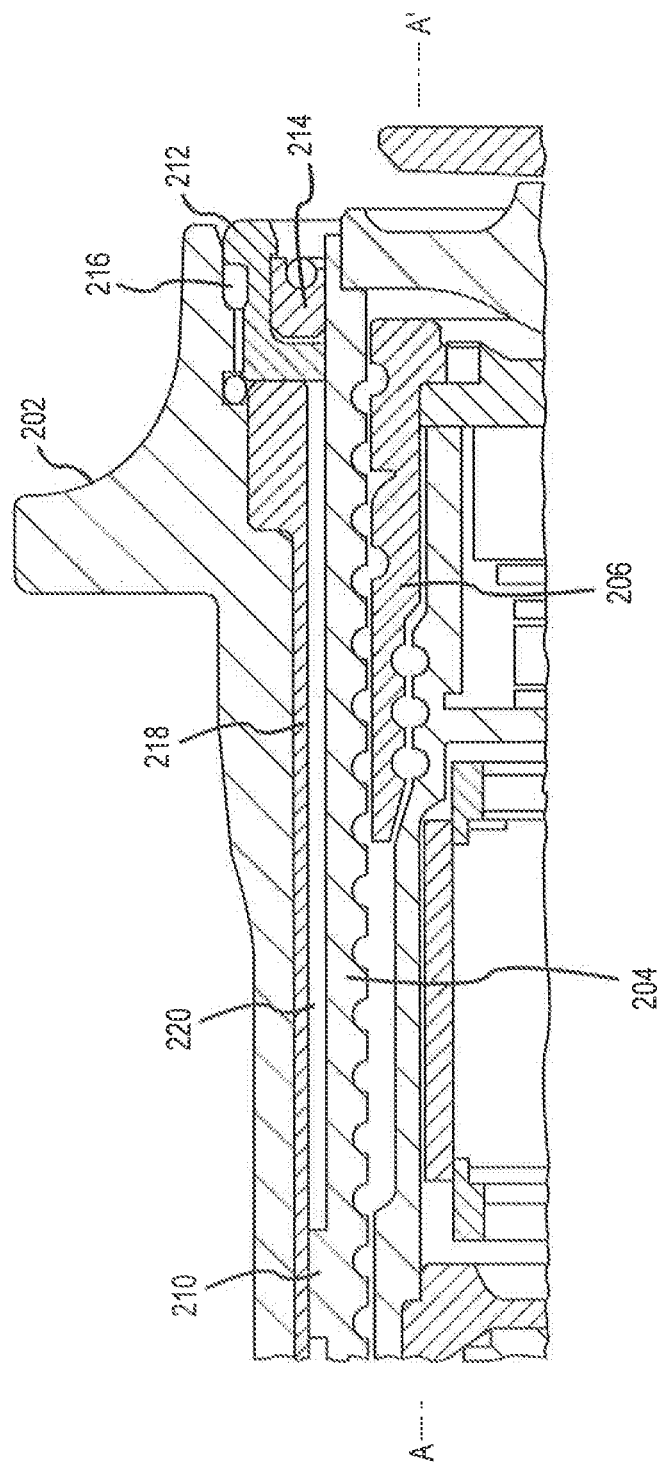
FIG. 2B illustrates, in accordance with various embodiments, a partial cross-sectional schematic view of an EMA shown in a retracted position.

Now, with reference to FIG. 2A, an EMA 200 is shown. The EMA 200 may, like the EMA 100, comprise an EMA housing 202, a ball nut 204, a ball screw 206, and a disc or puck 208. As above, the EMA housing 202 may comprise a generally annular structure configured to house the ball nut 204 and extend along the axis A-A'. The ball nut 204 may comprise a generally annular housing that extends axially along the axis A-A' within the EMA housing 202. The ball screw 206 may comprise a generally annular housing that extends axially along the axis A-A' within the ball nut 204. A variety of drive components may be housed within the ball nut 204, such as, for example, an electromechanical drive motor, drive shaft, gearing system, and the like. The puck 208 may comprise a generally disc shaped element, and the puck 208 may be coupled to a distal portion of the ball nut 204, As shown more specifically with respect to FIG. 2B, the EMA 200 described herein may comprise a ball nut 204 having a continuously annular tab or projection 210 that extends radially outward from the axis A-A'. The projection 210 is depicted as an exemplary block shaped tab, but may be any shaped structure. The projection 210 may extend radially outward such that it is raised above an outer surface of the ball nut 204. The EMA 200 may further comprise an annular member or stop 212 disposed at a distal portion of the EMA housing 202. The stop 212 may comprise an "L-shaped" or "doglegged" structure with a portion extending radially inward from an inner surface f EMA housing 202. A proximal portion of the stop 212 may incorporate a compliant or shock absorbing material, such as foam, rubber and/or polytetrafluoroethylene ("PTFE"). This material may dissipate energy, as described below, as the ball nut 204 comes into contact with the stop 212. The stop 212 may be coupled to the EMA 200 in any suitable manner. For instance, the stop 212 may be screwed into the EMA housing 202, heat bonded to the EMA housing 202, forged integral to the EMA housing 202, riveted to the EMA housing 202, bolted into the EMA housing 202, adhesively bonded to the EMA housing 202, and the like.

In operation, as the ball nut 204 translates axially in a distal direction, the projection 210 may advance axially in a distal direction toward the stop 212. On contact with the stop 212, the projection 210 may be halted in its distal progress. The stop 212 may however, unlike other conventional systems, tends to resist or eliminate EMA 200 failure. For example, the stop 212, comprising a continuous annular structure, may not rely upon one or more simple projections (e.g., projections 110 and 112) to arrest the angular momentum of the ball nut 104. Rather, the large (continuous) surface area of the annular projection 210 may permit the dissipation of angular and axial momentum over a much larger surface area. The projection 210 may also include a compliant member or material capable of dissipating energy, Dissipation of angular and axial momentum over this larger surface area reduces the overall stress experienced by any particular portion of the ball nut 204 and ball screw 206 (e.g., the projections 110 and 112 in the conventional system). The system of the present disclosure therefore embodies a much more reliable, failure-resistant, ball nut 204 stopping system. The cost and weight of the system of the present disclosure may also be reduced over that associated with more conventional systems, as projections 110 and 112 may be eliminated in favor of the annular projection 210 and stop 212.

With reference to FIG. 2B, a seal 214 may, in addition, be incorporated in the EMA 200, The seal 214 may be incorporated radially inward of the stop 212 such that it is disposed at a distal end of EMA housing 202 within a gap firmed by a radially inward facing surface of stop 212 and the outer surface of the ball nut 204. This seal 214 may comprise a variety of suitable sealing materials, e.g., PTFE, rubber, foam, plastic, etc. The seal 214 may further comprise a separate component (from the EMA 200) and/or the seal 214 may be molded directly onto and/or with the stop 212. Where the seal 214 comprises a part of the stop 212, the EMA 200 may be more easily serviced, because the stop 212 may simply be screwed onto and/or unscrewed (e.g., as a nut) from the EMA housing 200.

In operation, the seal 214 may eliminate or reduce dirt, debris, moisture, and the like from entering the EMA 200. In various embodiments, an O-ring 216 may be incorporated. The O-ring may comprise a variety of suitable sealing materials, e.g., rubber, team, plastic, PTFE, etc. The O-ring may further comprise a separate component (from the EMA 200) and/or the O-ring may he molded directly onto the stop 212.

A liner 218 may, in various embodiments, be incorporated between EMA housing 202 and the ball nut 204. The liner 218 may comprise a low friction material, such as a low friction polyimide material. This material may facilitate translation of the ball nut 204 into and out of the EMA housing 202. The material may, in addition, permit structural rigidity of the EMA 200. The liner 218 may comprise one or more grooves 220 (not shown) located on a radially inward facing surface of liner 218. The projection 210 may translate axially in distal and proximal directions (depending upon the direction of rotation of the ball screw 206) along these grooves 220. In various embodiments, the stop 212 may in fact be integrated as a single integrally formed component with the liner 218.

Benefits, other advantages, and solutions to problems have been described herein with regard to specific embodiments. Furthermore, the connecting lines shown in the various figures contained herein are intended to represent exemplary functional relationships and/or physical couplings between the various elements, it should be noted that many alternative or additional functional relationships or physical connections may be present in a practical system. However, the benefits, advantages, solutions to problems, and any elements that may cause any benefit, advantage, or solution to occur or become more pronounced are not to he construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more."

Systems, methods and apparatus are provided herein in the detailed description herein, references to "various embodiments", "one embodiment", "an embodiment", "an example embodiment", etc., indicate that the embodiment described may include a particular feature, structure, or characteristic, but every embodiment may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed. under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electromechanical actuator comprising:
   an electromechanical actuator housing having a distal stop that extends radially inward towards a longitudinal axis of the electromechanical actuator housing;
   a ball nut extending axially within the electromechanical actuator housing; and
   a ball screw extending axially within the ball nut,
      wherein the ball nut translates axially in a distal direction in response to a rotation by the ball screw, and
      wherein the ball nut is halted in the axially distal translation in response to contact with the distal stop of the actuator housing.

2. The electromechanical actuator of claim 1, wherein the distal stop is coupled to the electromechanical actuator housing.

3. The electromechanical actuator of claim 1, wherein the distal stop comprises a continuous annular structure.

4. The electromechanical actuator of claim 1, further comprising a seal located radially inward of a portion of the distal stop, said seal in contact with said portion and the ball nut, the seal adapted to prevent debris from entering the electromechanical actuator.

5. The electromechanical actuator of claim 1, wherein the ball nut comprises a projection extending radially outward from an outer surface of the ball nut.

6. The electromechanical actuator of claim 5, wherein the projection makes contact with the distal stop as the ball nut translates axially in the distal direction to halt the axially distal translation of the ball nut.

7. The electromechanical actuator of claim 1, wherein the projection comprises a continuous annular structure.

8. The electromechanical actuator of claim 1, wherein the distal stop includes a compliant surface.

9. An electromechanical actuator comprising:
   an annular electromechanical actuator housing, the electromechanical actuator housing having a distal stop that extends radially inward towards a longitudinal axis of the electromechanical actuator housing;
   a ball nut disposed radially inward of the electromechanical actuator housing, the ball nut extending axially within the electromechanical actuator housing; and
   a ball screw disposed radially inward of the ball nut, the ball screw extending axially within the electromechanical actuator housing,
      wherein the ball nut translates axially in a distal direction in response to a rotation by the ball screw, and
      wherein the ball nut is halted in the axially distal translation in response to contact with the distal stop.

10. The electromechanical actuator of claim 9, wherein the distal stop is coupled to the electromechanical actuator housing.

11. The electromechanical actuator of claim 9, wherein the distal stop comprises a continuous annular structure.

12. The electromechanical actuator of claim 9, further comprising a seal located radially inward of a portion of the distal stop, said seal in contact with said portion and the ball nut, the seal adapted to prevent debris from entering the electromechanical actuator.

13. The electromechanical actuator of claim 9, wherein the ball nut comprises a projection extending radially outward from an outer surface of the ball nut.

14. The electromechanical actuator of claim 13, wherein the projection makes contact with the distal stop in response to the ball nut translating axially in the distal direction to halt the axially distal translation of the ball nut.

15. The electromechanical actuator of claim 9, wherein the projection comprises a continuous annular structure.

* * * * *